United States Patent
Taguchi

(10) Patent No.: US 6,298,388 B1
(45) Date of Patent: *Oct. 2, 2001

(54) ELECTRONIC APPARATUS AND METHOD FOR DISCRIMINATING WHETHER A FIRST OR SECOND CARD IS ATTACHED THERETO

(75) Inventor: Tomishige Taguchi, Urawa (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/307,494

(22) Filed: Sep. 16, 1994

Related U.S. Application Data

(63) Continuation of application No. 07/803,608, filed on Dec. 9, 1991, now abandoned.

(30) Foreign Application Priority Data

Dec. 12, 1990 (JP) .................................................. 2-401147

(51) Int. Cl.$^7$ ...................................................... G06F 13/12
(52) U.S. Cl. .............................. 709/301; 710/16; 710/62; 710/13; 710/11; 711/115
(58) Field of Search ..................................... 364/200, 900; 395/425, 500, 828, 829, 872, 882, 833, 681; 439/946, 945; 396/211; 399/83; 711/115, 2; 710/11, 16, 62

(56) References Cited

U.S. PATENT DOCUMENTS

| | | | |
|---|---|---|---|
| 4,156,926 | * | 5/1979 | Hartman ................................ 711/103 |
| 4,561,711 | * | 12/1985 | Zrnich ..................................... 439/59 |
| 4,680,674 | * | 7/1987 | Moore ................................. 361/686 |
| 4,796,215 | * | 1/1989 | Hatta . |
| 4,821,107 | * | 4/1989 | Naito et al. . |
| 4,855,779 | * | 8/1989 | Ishikawa et al. . |
| 4,980,856 | * | 12/1990 | Ueno ..................................... 361/684 |
| 4,993,027 | * | 2/1991 | McGraw et al. ........................ 714/29 |
| 5,083,262 | * | 1/1992 | Haff, Jr. ................................ 395/500 |
| 5,101,444 | * | 3/1992 | Wilson et al. ........................ 382/174 |
| 5,179,666 | * | 1/1993 | Rimmer et al. ......................... 710/62 |
| 5,207,586 | * | 5/1993 | MacGregor et al. ................ 439/76.1 |
| 5,274,765 | | 12/1993 | Le Gallo . |
| 5,317,693 | * | 5/1994 | Cuenod et al. ........................... 710/9 |
| 5,359,713 | * | 10/1994 | Moran et al. ........................... 710/52 |
| 5,430,845 | * | 7/1995 | Rimmer et al. ...................... 709/301 |

FOREIGN PATENT DOCUMENTS

| | | | |
|---|---|---|---|
| 0251477 | * | 1/1988 | (EP) . |
| 0351961 | * | 1/1990 | (EP) . |
| 0 394 114 | * | 10/1990 | (EP) . |
| 0426414 | * | 5/1991 | (EP) . |

OTHER PUBLICATIONS

Gibson, Steve, "Device Driver 'Stubs' Smooth Path to Top SCSI Performance", *Infoworld,* Nov. 19, 1990.*

* cited by examiner

*Primary Examiner*—B. James Peikari
(74) *Attorney, Agent, or Firm*—Fitzpatrick, Cella, Harper & Scinto

(57) ABSTRACT

An electronic apparatus having a main body includes a connector for detachably connecting a first or second electronic circuit to the main body, a discriminator for discriminating whether the first electronic circuit or the second electronic circuit has been connected to the connector in accordance with information included in the first or second electronic circuit, and a device for executing transmission and reception of information to and from a memory provided in a first electronic circuit in the case where the discriminator discriminates that the first electronic circuit has been connected. The executing device also accesses data in an external device further connected to the second electronic circuit through a control circuit provided in the second electronic circuit in the case where the discriminator discriminates that the second electronic circuit has been connected. The invention also relates to a method for controlling such an electronic apparatus.

224 Claims, 8 Drawing Sheets

FIG. 3

| 1ST ROW | | | | 2ND ROW | | | |
|---|---|---|---|---|---|---|---|
| NO. | SIGNAL | NO. | SIGNAL | NO. | SIGNAL | NO. | SIGNAL |
| 1 | GND | 18 | NC | 35 | GND | 52 | NC |
| 2 | $D_3$ | 19 | $A_{16}$ | 36 | $\overline{LP_1}$ | 53 | NC |
| 3 | $D_4$ | 20 | $A_{15}$ | 37 | NC | 54 | NC |
| 4 | $D_5$ | 21 | $A_{12}$ | 38 | NC | 55 | *NC |
| 5 | $D_6$ | 22 | $A_7$ | 39 | NC | 56 | *NC |
| 6 | $D_7$ | 23 | $A_6$ | 40 | NC | 57 | *NC |
| 7 | $\overline{CS_1}$ | 24 | $A_5$ | 41 | NC | 58 | NC |
| 8 | $A_{10}$ | 25 | $A_4$ | 42 | NC | 59 | NC |
| 9 | $\overline{OE}$ | 26 | $A_3$ | 43 | NC | 60 | *NC |
| 10 | $A_{11}$ | 27 | $A_2$ | 44 | NC | 61 | *NC |
| 11 | $A_9$ | 28 | $A_1$ | 45 | CST | 62 | *NC |
| 12 | $A_8$ | 29 | $A_0$ | 46 | $A_{17}$ | 63 | BAT |
| 13 | $A_{13}$ | 30 | $D_0$ | 47 | $A_{18}$ | 64 | NC |
| 14 | $A_{14}$ | 31 | $D_1$ | 48 | $A_{19}$ | 65 | NC |
| 15 | $R/\overline{W}$ | 32 | $D_2$ | 49 | NC | 66 | NC |
| 16 | NC | 33 | WF | 50 | NC | 67 | $\overline{LP_2}$ |
| 17 | Vcc | 34 | GND | 51 | Vcc | 68 | GND |

*Prior Art*

ELECTRONIC APPARATUS AND METHOD FOR DISCRIMINATING WHETHER A FIRST OR SECOND CARD IS ATTACHED THERETO

This application is a continuation of application Ser. No. 07/803,608 filed Dec. 9, 1991, now abandoned.

BACKGROUND OF THE INVENTION

1. Field of the Invention

The invention relates to an electronic apparatus and, more particularly, to an electronic apparatus in which a detachable IC card is connected to an IC card junction portion and a CPU bus of the electronic apparatus main body is connected to the IC card by the junction portion and the IC card is used as an external memory device.

2. Related Background Art

FIG. 8 shows an external view of a conventional data processing apparatus such as personal computer, word processor, or the like and an IC card which is used as a small external memory device for the data processing apparatus.

A construction of a data processing apparatus 90 shown in FIG. 8 is used in a word processor, a personal computer, or the like and has a display 68 comprising an LCD panel or the like and a keyboard 86 as user interface means. The apparatus 90 also has an IC card 50 as an external memory device. Reference numeral 91 denotes an eject lever to remove the IC card 50.

As shown in FIG. 9, a control system of the data processing apparatus 90 comprises: a CPU 65; various control circuits which are connected to a data/address bus of the CPU 65; the display 68; a power source (P/S) section 84; and the key input section 86.

The IC card 50 is connected through an IC card connector 60 in a slot which is formed in the side wall of the keyboard 86 in FIG. 8.

The IC card is used as a memory area to store processing data of the apparatus main body, operation data or KANJI (Chinese characters) font data which has already been stored in the card, or data of utility softwares, or the like.

A plurality of read only memories (ROMs) 54 and a plurality of random access memories (RAMs) 55 are enclosed in the IC card 50 and are connected to the IC card connector 60 through a buffer 53 and a junction portion 51 by an address/data/control bus 56.

The address/data/control bus of the data processing apparatus 90 and signal lines of a power source and the like are also connected from the apparatus main body to the IC card connector 60 through a buffer 62 as necessary as shown in FIG. 9. The signal is connected to the IC card 50 by the connector.

To the address/data/control bus of the CPU 65, there are connected: a KANJI (or Chinese characters) ROM 69; a DMA controller 70; an RAM 82; an ROM 83; a timer 81; an I/O controller 71; a display controller 66 to control the input/output operation for the display 68 and keyboard 86; a key input controller 85; and the like.

An external expansion bus connector 89 is provided on the rear wall (not shown in FIG. 8) of the main body. A hard disc or an external control unit can be connected to the external expansion bus connector 89 through an exclusive control board and can be used to expand the external memory or to control the apparatus.

In recent years, a higher degree of miniaturization of the apparatus has been evident. In the apparatus as mentioned above, it is becoming impossible to provide enough apace to attach both of the connector 60 for the IC memory and the external expansion bus connector 89. For instance, there are also commercially available a portable data processing apparatus and the like such as an IC card system pocket-book, an IC card electronic calculator, and the like having a small space only for providing a connector terminal for the IC card.

On the other hand, in such an apparatus as well, the function such as a high processing speed to input/output data from/to an external apparatus or the like is required similarly for the case of a desk-top type personal computer or the like.

As mentioned above, however, in recent years, it is difficult to assure an installation space for the connector to input/output data from or to an external device. In a conventional device, using a countermeasure is used, such that the control of the external device and the data input/output operation are executed or the like by using a serial communication connector. This is because the installation space for the serial communication connnector is smaller than that for the external expansion bus connector since the serial communication connector has only a signal line.

According to the above method, however, the high-speed input/output operation cannot be executed by a communication device using the serial communication connector. Such a method can be used for only an interface with a relatively low-speed external device such as printer, analog modem, or the like. It is difficult to apply the above method to an application field such that the memory of the IC card of a small capacity is expanded by connecting an external memory or the like.

SUMMARY OF THE INVENTION

It is the first object of the invention that even in a small electronic apparatus having a limited installation space, the data input/output operation can be executed at a high speed by using an IC card interface.

The second object of the invention is to enable an input/output operation with an external device such as an external memory device or the like to be performed through pseudo card means connected under the same junction condition as that for the IC card connector.

BRIEF DESCRIPTION OF THE DRAWINGS

FIG. 3 is a diagram of a table showing a pin arrangement of a junction portion on the pseudo IC card side;

DETAILED DESCRIPTION OF THE PREFERRED EMBODIMENTS

Figure 1:
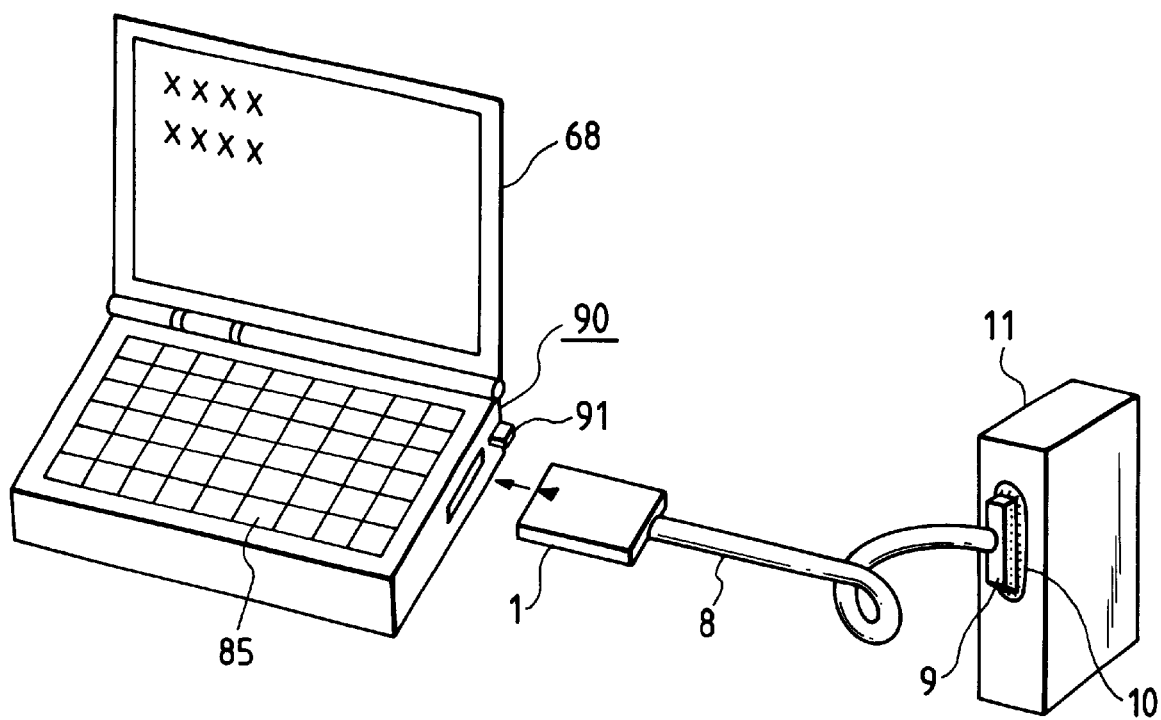
FIG. 1 is a perspective view showing an external view of a data processing apparatus employing the invention.

The invention will be described in detail hereinbelow on the basis of an embodiment shown in the drawings. In the following description, the same or corresponding members as those of the conventional apparatus are designated by the same reference numerals and their detailed descriptions are omitted.

According to the invention, an external device (an expansion port of an external expansion memory device such as a floppy disk, a hard disk device, a semiconductor memory, etc., or another apparatus such as a computer, word processor, etc., or the like) is connected to the data processing apparatus 90 by using an IC card interface.

As shown in FIG. 1, in an electronic apparatus using the invention, a pseudo IC card (second card) 1 is inserted into an IC card slot (inserting hole) and is used in place of the IC card (first card) 50. The pseudo IC card 1 is constructed as a pseudo IC card section. The CPU of the data processing apparatus 90 executes the input/output operation to the same interface as the ordinary IC card 50 for the pseudo IC card 1, so that the CPU can perform the input/output operation to an external device 11.

The pseudo IC card 1 has a cable 8 to execute the input/output operation to the external device 11. The cable 8 is connected to the external device 11 through connectors 9 and 10. In the above construction, since the input/output interface between the pseudo IC card 1 and the external device 11 can be executed irrespective of the data processing apparatus 90 side, it can be performed by arbitrary means such as an SCII interface or the like.

An explanation will now be provided hereinbelow of an example in which the external device 11 is constructed as an external expansion memory device such as a floppy disk, a hard disk device, a semiconductor memory, or the like and supplements the capacity of the IC card and data is handled as if the apparent capacity of the IC card when it is seen from the data processing apparatus 90 has increased.

Figure 2:
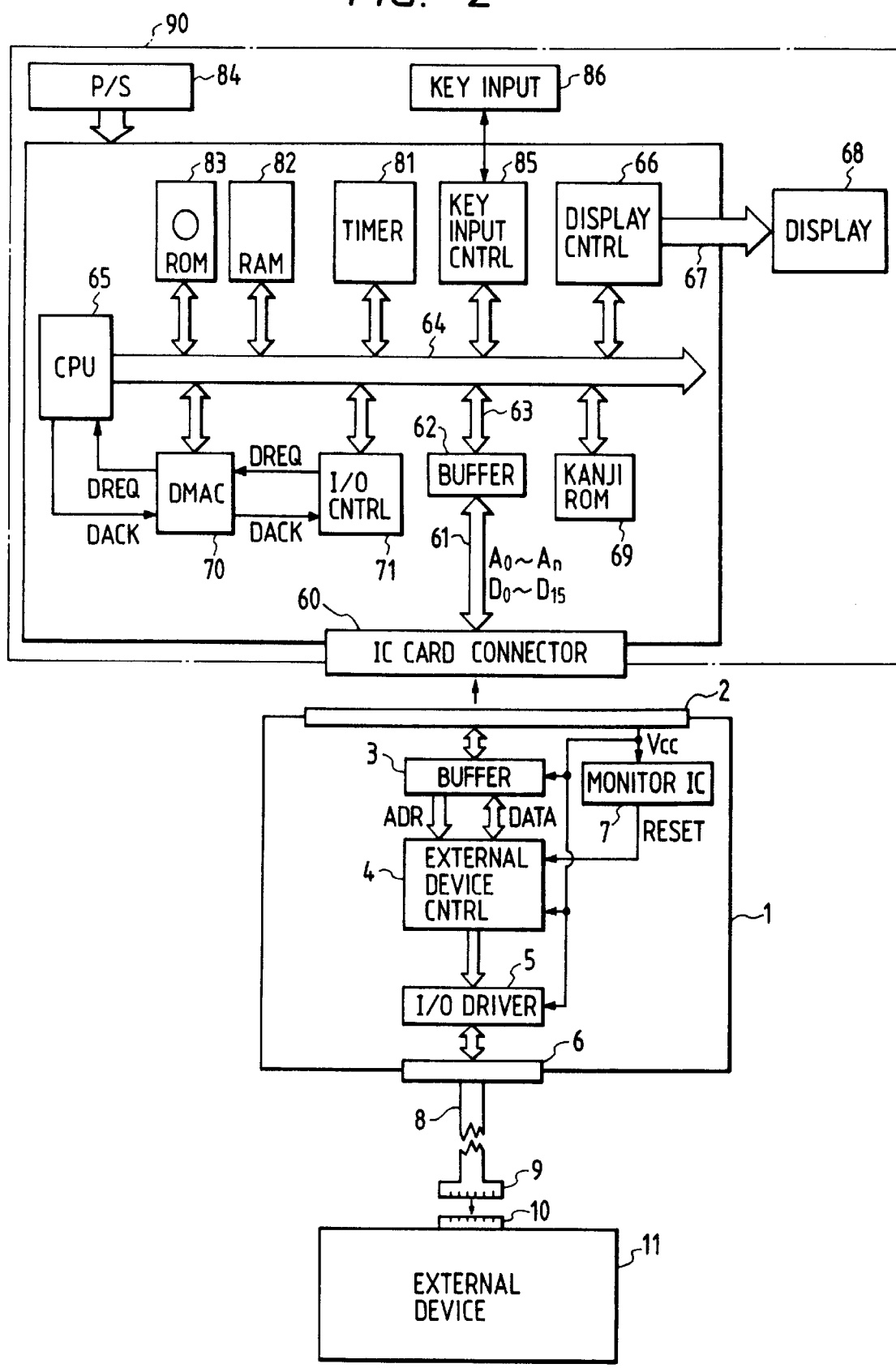
FIG. 2 is a block diagram of a control system of the apparatus of FIG. 1.

In FIG. 2, in a manner similar to the conventional apparatus, the data processing apparatus 90 is constructed by a display 68, a power source section 84, and a key input section 86 and has the IC card connector 60 on the side wall of the apparatus main body at a position adjacent to the key input section.

In a manner similar to the conventional apparatus, internal circuits of the data processing apparatus 90 comprise: a RAM 82 to store data or utility softwares; a timer IC 81 which is used to calculate an execution period or an operation time; a key input controller 85 to convert a key input code from the key input section 86 into a code in a form which can be easily read by a CPU 65; a display controller 66 to convert display characters sent from the CPU 65 so as to be displayed by the display 68 such as LCD or plasma display; the KANJI (or Chinese characters) ROM 69 which is referred as necessary to convert the display characters to the display 68 into KANJI; an I/O controller 71 of a communication control IC such as an RS232C or the like for communication with a outside; the DMA controller 70 to control a DMA (direct memory access) from the I/O controller 71; and the like.

The apparatus of the invention differs from the conventional apparatus because the pseudo IC card 1 is not constructed so as to use the self internal memory as in the IC card but has an external device controller 4 to control the input/output operation to the external device 11, an I/O driver 5, a mold member 6 to connect the cable 8 and the I/O driver 5, and a monitor 7 to assure safety.

A buffer 3 receives an input/output signal for the apparatus main body from a junction portion 2 and electrically protects the internal circuits. The external device controller 4 converts the signal from the buffer into a signal timing of the external device. The I/O driver 5 is provided to execute the input/output operation to the external device 11 by a predetermined interface system (SCII or the like) which can accurately perform communication between the external device controller 4 and the external device 11 even when the cable 8 is long to a certain extent.

Further, the monitor 7 monitors the power source voltage which is supplied from the data processing apparatus 90 to the pseudo IC card 1 through the junction portion 2 and provides a reset signal to the external device controller 4 at a time when the power source voltage is lower than a predetermined voltage, thereby preventing runaway of the CPU.

FIG. 3 is a table diagram showing a pin arrangement of two rows of the junction portion 2 of the pseudo IC card 1 in order to connect the pseudo IC card 1 to the data processing apparatus 90. Numbers in the table indicate the pin numbers and each signal name is shown by a code which is generally used. For instance, GND indicates a ground potential; $D_0$ to $D_n$ denote bits of the data bus; $A_0$ to $A_n$ denote bits of the address bus; CS denotes a chip enable signal; and NC denotes a non-connection signal.

Figure 4:
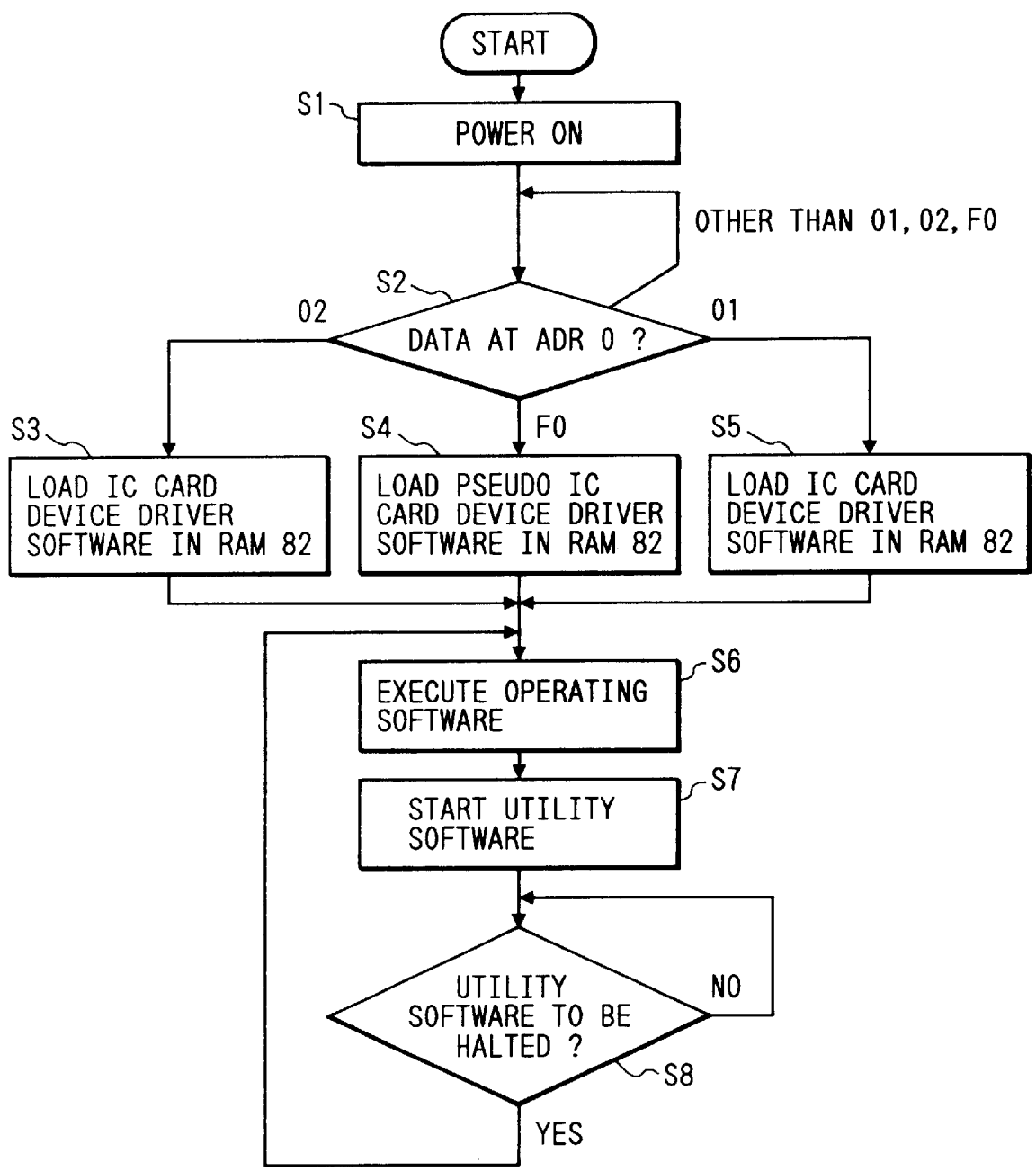
FIG. 4 is a flowchart showing the operation of the apparatus of FIG. 1.

The operation of the above construction will now be explained with reference to FIGS. 4 and 5. FIG. 4 shows a control procedure of the data processing apparatus 90 by the CPU 65.

When a power source is turned on in step S1 in FIG. 4, the CPU 65 starts the execution of the operating system software of the data processing apparatus stored in the ROM 83 and starts to check the function of each of the internal ICs.

Figure 5:
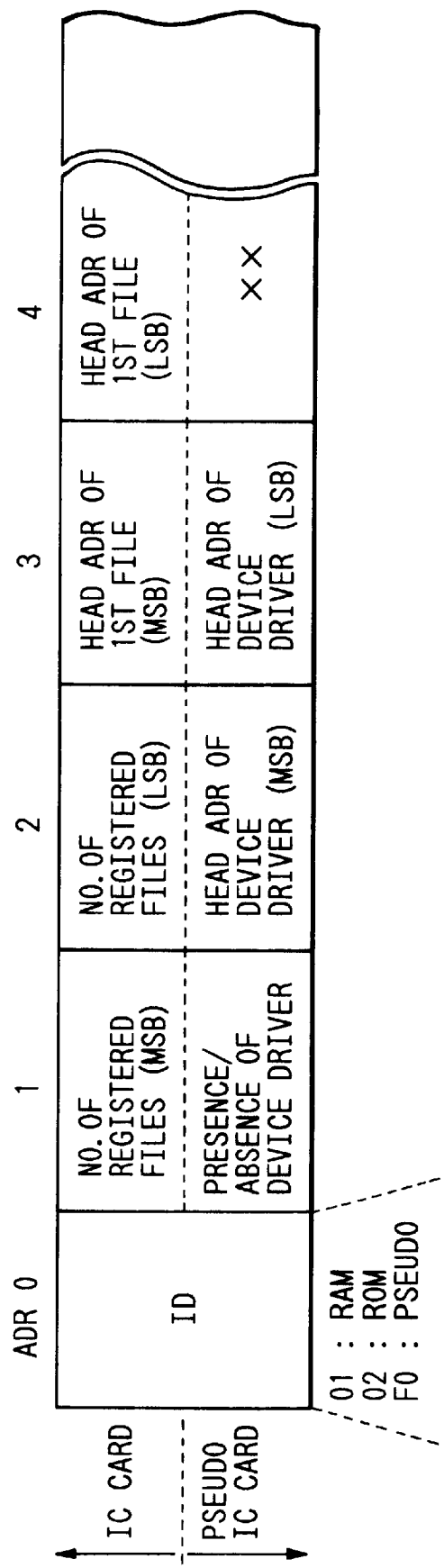
FIG. 5 is an explanatory diagram showing a data construction to distinguish between an IC card and a pseudo IC/card.

In the next step S2, directory management data stored in the head address of the IC card 50 or pseudo IC card 1 as shown in FIG. 5 is read in order to automatically discriminate whether the IC card has been connected or the pseudo IC card has been connected to the IC card connector 60.

FIG. 5 shows information for the CPU 65 to handle the IC card 50 or pseudo IC card 1 as a file. Such information is stored into addresses 0 to 4 of the IC card 50 or pseudo IC card 1.

As shown in the diagram, different kinds of data are stored into those addresses by the IC card 50 or pseudo IC card 1.

Information (01 (hexadecimal notation) in the case where the device is an RAM card; 02 in the case of ROM card; FO in the case of the pseudo IC card 1) indicative of the kind of IC card 50 or the distinguishment between the IC card 50 and the pseudo IC card 1 is stored into address 0.

In the case of the IC card 50, words (stored in addresses 1 and 2) indicative of the number of registered files and words (stored in addresses 3 and 4) indicative of the head address of the first file are stored into subsequent addresses 1 to 4. Necessary file location information is stored into the subsequent addresses.

In the case of the pseudo IC card 1, the head address of a device driver program to access to the pseudo IC card 1 stored in the ROM 83 on the apparatus main body side is stored into addresses 2 and 3.

In step S2, the data indicative of the kind of device in address 0 is read and when the data kind indicates the IC card, the processing routine advances to steps S3 and S5. An ordinary IC card control driver software written in the ROM 83 is loaded into the RAM 82. The CPU 65 sequentially executes programs stored in the RAM 82 and controls a method of giving a signal to the IC card connector and handles the IC card 50 as an ROM card or an RAM card. The above operations are substantially the same as those in the conventional apparatus.

On the other hand, in the case where the read directory management data indicates the pseudo IC card in step S2, step S4 follows and the device driver program for the pseudo IC card control is loaded from the ROM 83 into the RAM 82. After that, in the run of the operating system in steps S6 to S8, the CPU 65 sequentially executes the programs in the RAM 82 and changes a method of giving signals to the IC card connector 60 to a method of giving control signals according to the kind of external device which is connected.

On the pseudo IC card 1 side, a high-speed communication by parallel transfer using the CPU bus is executed between the data processing apparatus 90 and the CPU 65. The external device controller 4 executes the necessary data conversion or interface conversion on the basis of the high-speed communication, thereby performing the input/output operation to the external device 11.

As mentioned above, the electronic apparatus can be used for expansion of an external memory or for control of an external device by using the IC card connecting portion of the data processing apparatus 90 through the pseudo IC card 1 in which the shape, signal arrangement, and characteristics are the same as those of the IC card section. Therefore, even in a small data processing apparatus such that there is not enough space to attach a connector terminal for expansion of an external memory and only a slot (inserting hole) of an IC card can be arranged, the transmission and reception of data with an external device can be realized by the high-speed parallel data transmission using the CPU bus.

Figure 6:
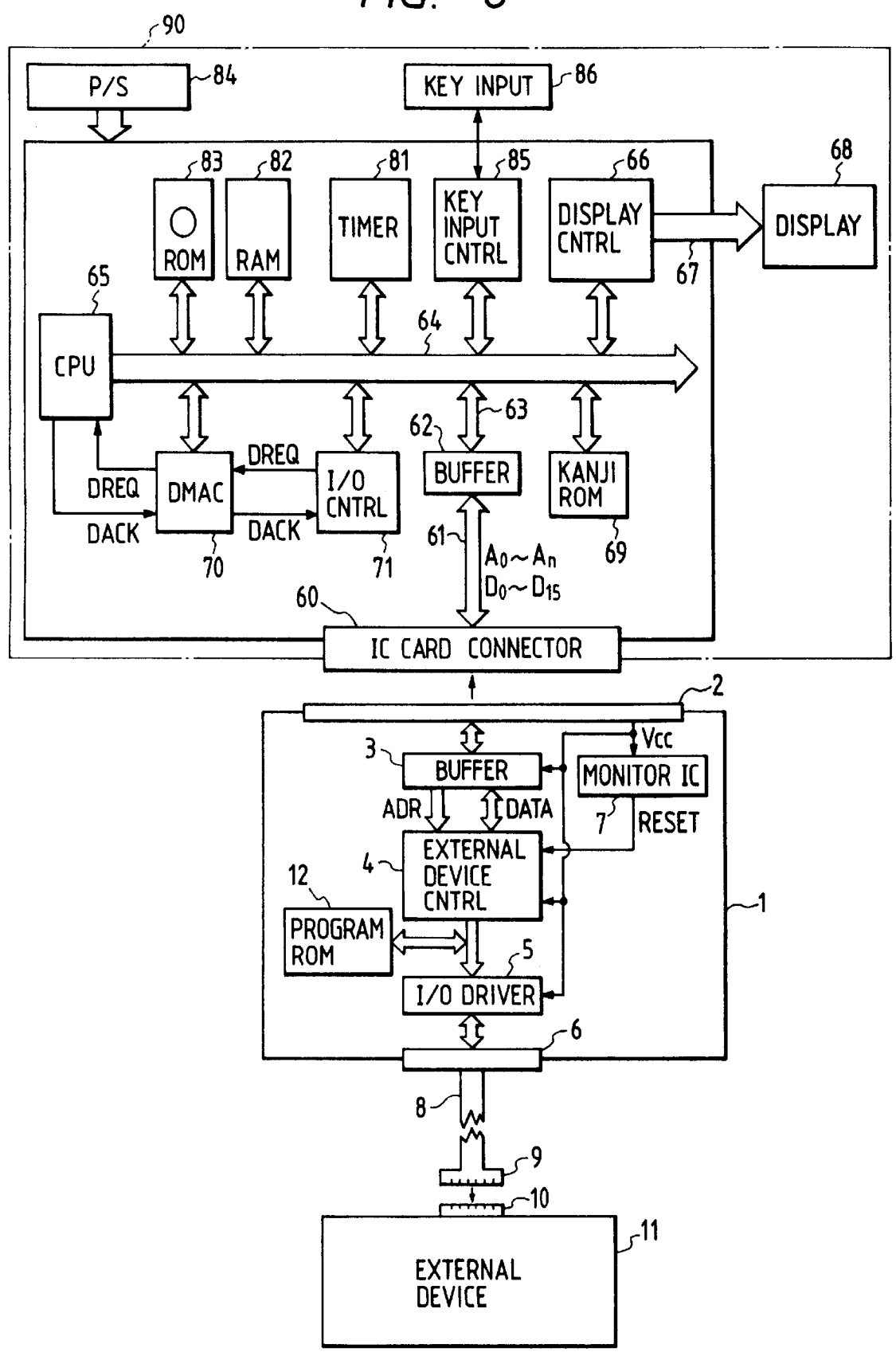
FIG. 6 is a block diagram showing an embodiment of a different control system of the electronic apparatus.

In the above embodiment, the device driver program to execute the input/output operation to/from the pseudo IC card 1 is stored into the ROM 82 on the data processing apparatus 90 side. As shown in FIG. 6, however, it is also possible to construct in a manner such that an ROM 12 is provided for the pseudo IC card 1 and a device driver program to execute the interface which is peculiar to the pseudo IC card 1 is stored therein and is transferred to the RAM 82 on the apparatus main body side at the start of the program.

In the above case, when it is determined that the pseudo IC card 1 is connected in the discrimination about the device in step S2 in FIG. 4, for the access procedure, the device driver program is loaded not from the RAM 82 but from the ROM 12 in the pseudo IC card 1 in step S4.

According to the above construction, a device driver such that the use of the pseudo IC card 1 will not be presumed in the future doesn't need to be stored into the main memory in vain. The main memory comprising the ROM and RAM on the main body side of the data processing apparatus 90 can be saved and effectively used.

Since the device driver program is stored in the pseudo IC card 1, the changing and maintenance of the device driver program can be also easily performed.

Further, in the above embodiment, although the data processing apparatus has been considered as an electronic apparatus which handles characters such as a word processor, a note-shaped personal computer, an electronic pocketbook, or the like, the invention is also effective for all apparatuses using an IC card such as an electronic calculator which handles numerals, a facsimile apparatus which handles a video image, an electronic camera, and the like.

Figure 7:
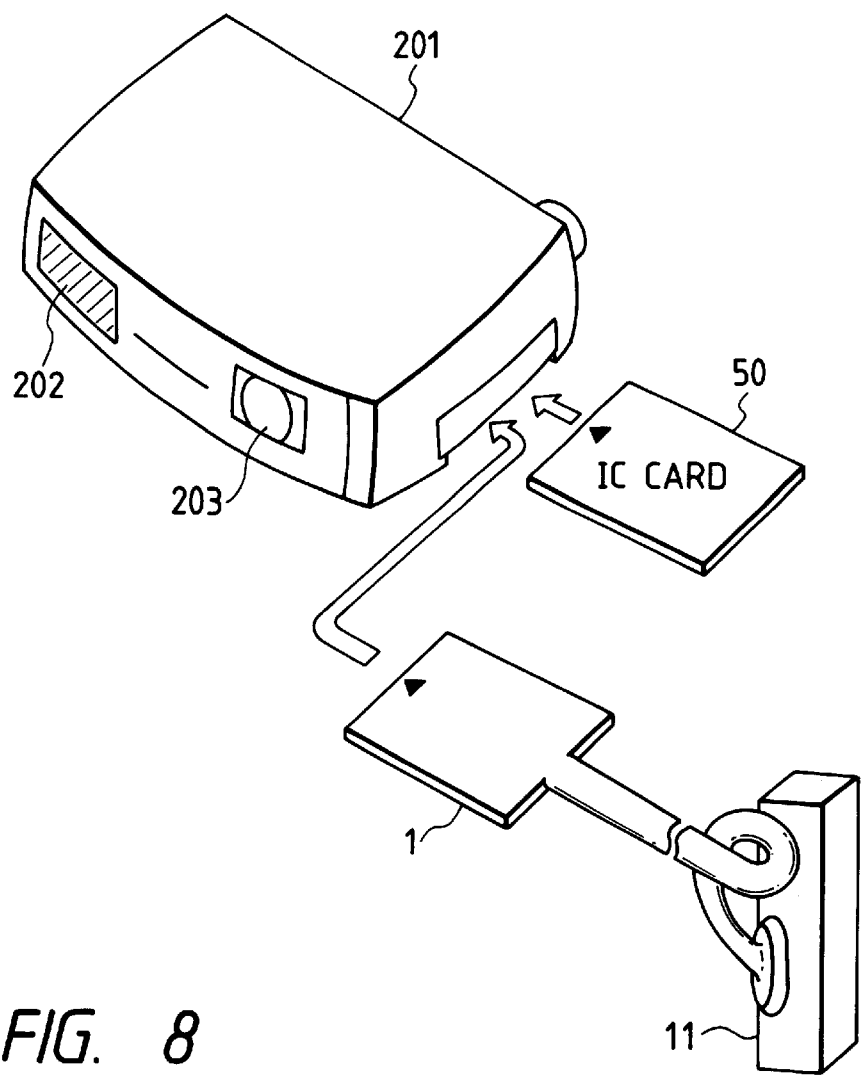
FIG. 7 is a perspective view showing a state in which the invention is applied to an electronic camera.
Figure 8:
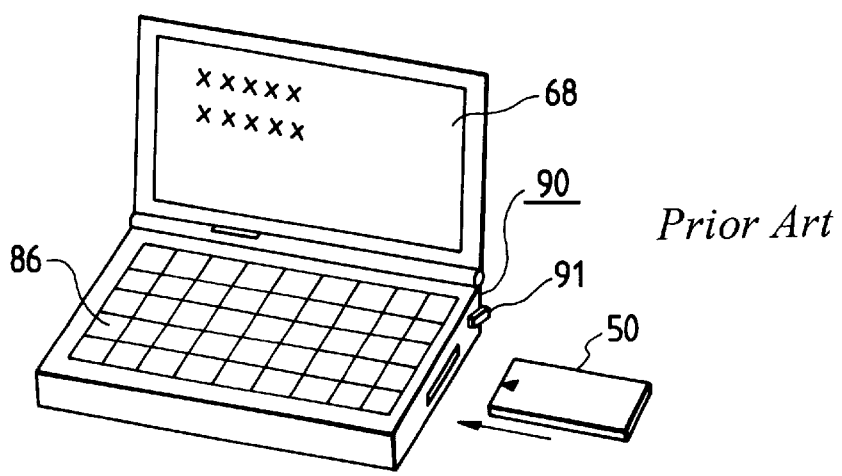
FIG. 8 is a perspective view showing a construction of a conventional electronic apparatus.
Figure 9:
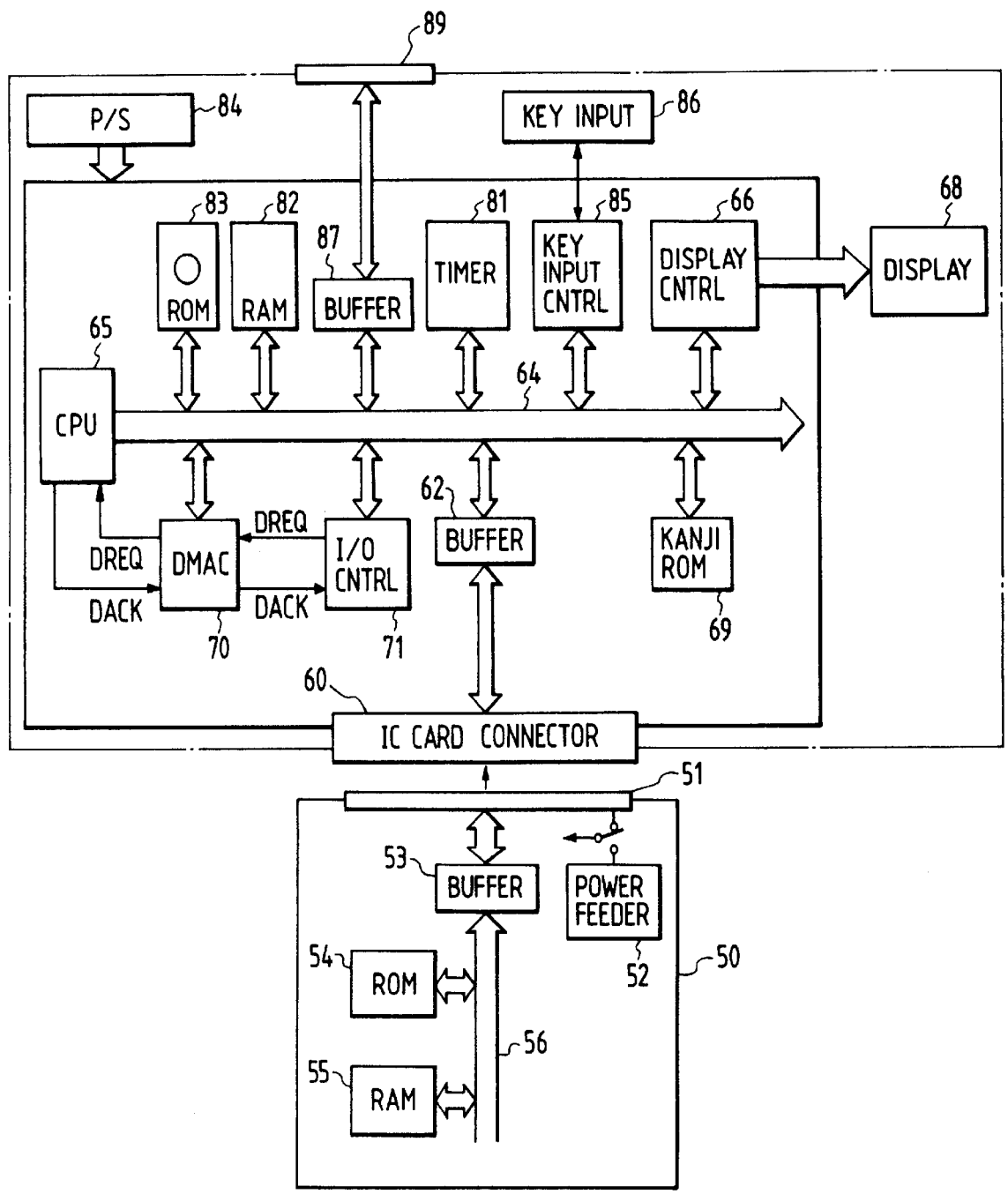
FIG. 9 is a block diagram showing a construction of a control system of the conventional electronic apparatus.

FIG. 7 shows a schematic diagram when the invention is applied to an IC card camera. FIG. 7 shows an electronic camera which stores photographed images into the IC card 50. Reference numeral 202 denotes a flash and 203 indicates a lens to photograph an image. The other elements of the camera mechanism are substantially the same as that of the conventional apparatus except that in the control system of the camera, the portion which handles the interface of the IC card 50 is constructed as shown in FIG. 1 or 6 to thereby enable the pseudo IC card 1 as mentioned above to be connected.

According to the above construction, the external device 11 can be connected through the pseudo IC card 1 in place of the IC card 50 and the number of photographed images of about tens of images can be remarkably increased.

In the above embodiment, upon the start of the program, the discrimination between the pseudo IC card 1 and the IC card 50 and the setting of the device driver are executed. Upon exchange of the pseudo IC card 1 and IC card 50, the discrimination of the device, the loading of the device driver, and the like can be also dynamically performed.

Further, in the above embodiment, the pseudo IC card 1 and the external device are connected by using the cable. However, the cable is not an indispensable element and the pseudo IC card 1 can be also directly attached to the external device.

As will be obviously understood from the above explanation, according to the invention, in an electronic apparatus in which a detachable IC card is connected to the IC card junction portion and the CPU bus of the electronic apparatus main body is connected to the IC card by the junction portion and the IC card is used as an external memory device, there is provided the pseudo card means having a junction portion which can be connected to the IC card junction portion of the electronic apparatus main body, and further, the pseudo card means has therein the control means for converting the data input/output interface between the electronic apparatus and the pseudo card means and the data input/output interface between a predetermined external device and the pseudo card means, and the data input/output operation is executed between the electronic apparatus main body and the external device through the pseudo card means. Therefore, there is an excellent advantage such that even in a small data processing apparatus in which the connector terminal for expansion of an external memory cannot be separately attached, the data input/output operation can be executed between the apparatus main body and an external device at a high speed by using the bus of the IC card through the pseudo card means connected to the IC card junction portion.

What is claimed is:

1. An information processing apparatus for performing high-speed parallel data transmission with an external device through an IC and pseudo IC card connector comprising:

an IC and pseudo IC card connector for connecting an IC card and a pseudo IC card to said apparatus, the pseudo IC card connecting to an external device, the pseudo IC card comprising an external device controller controlling the input/output operation to/from the external device; and a central processing unit, wherein said central processing unit determines whether an IC card or a pseudo IC card is attached to said IC and pseudo IC card connector by reading and discriminating directory management data stored in the card attached to said information processing apparatus through said IC and pseudo IC card connector, wherein said central processing unit loads an IC card control driver into a second memory from a first memory, the IC card control driver being used if said central processing unit determines that an IC card is connected to said IC and pseudo IC card connector, wherein said central processing unit loads a pseudo IC card control driver into the second memory from a first memory, the pseudo IC card control driver being used if said central processing unit determines that a pseudo IC card is connected to said IC and pseudo IC card connector, wherein said central processing unit Performs parallel data transmission between said information processing apparatus and the external device through the IC and pseudo IC card connector and the pseudo IC card when said central processing unit determines that a pseudo IC card is connected to said IC and pseudo IC card connector and the pseudo IC card control driver is loaded into the second memory, wherein the first memory is located in one of said information processing apparatus and the pseudo IC card.

2. An apparatus according to claim 1, wherein the external device comprises a random access memory card.

3. An apparatus according to claim 1, wherein the external device comprises a read only memory card.

4. An apparatus according to claim 1, wherein the external device comprises an input/output card for inputting or outputting information between said information processing apparatus and another information processing apparatus.

5. An apparatus according to claim 1, wherein the external device comprises another information processing apparatus which is connected by said IC and pseudo IC card connector via an interface cable.

6. An apparatus according to claim 1, wherein said central processing unit executes a program comprising an operating system.

7. An apparatus according to claim 1, wherein the loaded driver comprises a program for controlling the external device connected by said IC and pseudo IC card connector.

8. An apparatus according to claim 1, wherein said central processing unit executes a program for loading the pseudo IC card control driver or the IC card control driver for the external device connected by said IC or pseudo IC card connector from the connected external device, wherein said central processing unit executes the loaded driver to control the external device connected by said IC and pseudo IC card connector.

9. An apparatus according to claim 1, wherein said central processing unit executes a program for loading the IC card control driver or the pseudo IC card control driver when said apparatus is turned on.

10. An apparatus according to claim 1, wherein said central processing unit executes a program for loading the IC card control driver or the pseudo IC card control driver when the external apparatus is connected by said IC card and pseudo IC card connector.

11. An apparatus according to claim 1, wherein said apparatus comprises a notebook personal computer.

12. An apparatus according to claim 1, wherein said apparatus comprises an electronic pocket book.

13. An apparatus according to claim 1, wherein said apparatus comprises an electronic camera.

14. An apparatus according to claim 1, wherein said apparatus comprises a facsimile apparatus.

15. An apparatus according to claim 1, wherein said connector has 68 signal pins.

16. An apparatus according to claim 1, further comprising a memory for storing the loaded driver.

17. An apparatus according to claim 1, further comprising a memory for storing a program for loading the IC card control driver or the pseudo IC card control driver.

18. An apparatus according to claim 1, further comprising a display for displaying a character.

19. An apparatus according to claim 1, further comprising a keyboard for inputting a character.

20. An information processing apparatus for performing high-speed parallel data transmission with an external device through an IC and pseudo IC card connector comprising:

an IC and pseudo IC card connector means for connecting an IC and a pseudo IC card to said apparatus, said IC and pseudo IC card being connectable to an external device, said pseudo IC card comprising an external device controller controlling the input/output operation to/from the external device; and means for determining whether an IC card or a pseudo IC card is attached to said IC and pseudo IC card connector by reading and discriminating directory management data stored in the card attached to said information processing apparatus through said IC and pseudo IC card connector, wherein said determining means loads an IC card control driver into a second memory from a first memory, the IC card control driver being used if said central processing unit determines that an IC card is connected to said IC and pseudo IC card connector, wherein said determining means loads a pseudo IC card control driver into the second memory from a first memory, the pseudo IC card control driver being used if said central processing unit determines that a pseudo IC card is connected to said IC and pseudo IC card connector, wherein said determining means performs parallel data transmission between said information processing apparatus and the external device through the IC and pseudo IC card connector and the pseudo IC card when said central processing unit determines that a pseudo IC card is connected to said IC and pseudo IC card connector and the pseudo IC card control driver is loaded into the second memory, wherein the first memory is located in one of said information processing apparatus and the pseudo IC card.

21. An apparatus according to claim 20, wherein the external device comprises a random access memory card.

22. An apparatus according to claim 20, wherein the external device comprises a read only memory card.

23. An apparatus according to claim 20, wherein the external device comprises an input/output card for inputting or outputting information between said information processing apparatus and another information processing apparatus.

24. An apparatus according to claim 20, wherein the external device comprises another information processing apparatus which is connected by said IC and pseudo IC card connector means via an interface cable.

25. An apparatus according to claim 20, wherein said determining means loads the driver in accordance with an operating system for loading the driver for the external device from the external device.

26. An apparatus according to claim 20, wherein the loaded driver comprises a program for controlling the external device connected by said IC and pseudo IC card connector means.

27. An apparatus according to claim 20, further comprising means for executing the loaded driver to control the external device connected by said IC and pseudo IC card connector means.

28. An apparatus according to claim 20, wherein said determining means loads the driver when said apparatus is turned on.

29. An apparatus according to claim 20, wherein said determining means loads the driver when the external apparatus is connected by said IC and pseudo IC card connector means.

30. An apparatus according to claim 20, wherein said apparatus comprises a notebook personal computer.

31. An apparatus according to claim 20, wherein said apparatus comprises an electronic pocket book.

32. An apparatus according to claim 20, wherein said apparatus comprises an electronic camera.

33. An apparatus according to claim 20, wherein said apparatus comprises a facsimile apparatus.

34. An apparatus according to claim 20, wherein said connector has 68 signal pins.

35. An apparatus according to claim 20, further comprising the second memory for storing the loaded driver.

36. An apparatus according to claim 20, further comprising a display for displaying a character.

37. An apparatus according to claim 20, further comprising a keyboard for inputting a character.

38. A storage medium used in an information processing apparatus for performing high speed parallel data transmission with an external device through an IC and pseudo IC card connector for connecting an IC card and a pseudo IC card to the information processing apparatus, the pseudo IC card connecting to an external apparatus, the pseudo IC card comprising an external device controller controlling the input/output operation to/from an external device, said storage medium comprising storage means for storing a program for causing the information processing apparatus to determine whether an IC card or a pseudo IC card is attached to said IC and pseudo IC card connector by reading and discriminating directory management data stored in the card attached to said information processing apparatus through said IC and pseudo IC card connector, wherein said program causes the information processing apparatus to load an IC card control driver into a second memory from a first memory, the IC card control driver being used if said information processing apparatus determines that an IC card is connected to said IC and pseudo IC card connector, wherein the program also causes the information processing apparatus to load a pseudo IC card control driver into the second memory from the first memory, the pseudo IC card control driver being used if said information processing apparatus determines that a pseudo IC card is connected to said IC and pseudo IC card connector, wherein the program also causes the information processing apparatus to perform parallel data transmission between said information processing apparatus and the external device through the IC and pseudo IC card connector and the pseudo IC card when said information processing apparatus determines that a pseudo IC card is connected to said IC and pseudo IC card connector and the pseudo IC card control driver is loaded into the second memory, wherein the first memory is located in one of said information processing apparatus and the pseudo IC card.

39. A storage medium according to claim 38, wherein the external device comprises a random access memory card.

40. A storage medium according to claim 38, wherein the external device comprises a read only memory card.

41. A storage medium according to claim 38, wherein the external device comprises an input/output card for inputting or outputting information between said information processing apparatus and another information processing apparatus.

42. A storage medium according to claim 38, wherein the external device comprises another information processing apparatus which is connected by said IC and pseudo IC card connector via an interface cable.

43. A storage medium according to claim 38, wherein the program stored in said storage means comprises an operating system.

44. A storage medium according to claim 38, wherein the loaded driver comprises a program for controlling the external device connected by the IC and pseudo IC card connector.

45. A storage medium according to claim 38, wherein the program stored in said storage means is executed when the information processing apparatus is turned on.

46. A storage medium according to claim 38, wherein the program stored in said storage means is executed when the external apparatus is connected by the IC and pseudo IC card connector.

47. A storage medium according to claim 38, wherein the information processing apparatus comprises a notebook personal computer.

48. A storage medium according to claim 38, wherein the information processing apparatus comprises an electronic pocket book.

49. A storage medium according to claim 38, wherein the information processing apparatus comprises an electronic camera.

50. A storage medium according to claim 38, wherein the information processing apparatus comprises a facsimile apparatus.

51. A storage medium according to claim 38, wherein the connector has 68 signal pins.

52. A storage medium according to claim 38, wherein the information processing apparatus further comprises the second memory for storing the loaded driver.

53. A storage medium according to claim 38, wherein the information processing apparatus further comprises a display for displaying a character.

54. A storage medium according to claim 38, wherein the information processing apparatus further comprises a keyboard for inputting a character.

55. An information processing apparatus for performing high speed parallel data transmission with an external device through an IC and pseudo IC card comprising:

an IC and pseudo IC card connector for connecting an IC card and a pseudo IC card to said apparatus, the pseudo IC card connecting to an external device, the pseudo IC card comprising an external device controller controlling the input/output operation to/from the external device; and a memory for storing a program causing the information processing apparatus to determine whether an IC card or a pseudo IC card is attached to said IC and pseudo IC card connector by reading and discriminating directory management data stored in the card attached to said information processing apparatus through said IC and pseudo IC card connector wherein the program causes the information processing apparatus to load an IC card control driver into second memory means from first memory means, the IC card control driver being used if said information processing apparatus determines that an IC card is connected to said IC and pseudo IC card connector, wherein the program also causes the information processing apparatus to load a pseudo IC card control driver into the second memory means from the first memory means, the pseudo IC card control driver being used if said information processing apparatus determines that a pseudo IC card is connected to said IC and Pseudo IC card connector, wherein the program also causes the information processing apparatus to perform parallel data transmission between said information processing apparatus and the external device through the IC and pseudo IC card connector and the pseudo IC card when said information processing apparatus determines that a pseudo IC card is connected to said IC and pseudo IC card connector and the pseudo IC card control driver is loaded into the second memory means, wherein the first memory means is located in one of said information processing apparatus and the pseudo IC card.

56. An apparatus according to claim 55, wherein the external device comprises a random access memory card.

57. An apparatus according to claim 55, wherein the external device comprises a read only memory card.

58. An apparatus according to claim 55, wherein the external device comprises an input/output card for inputting or outputting information between said information processing apparatus and another information processing apparatus.

59. An apparatus according to claim 55, wherein the external device comprises another information processing apparatus which is connected by said IC and pseudo IC card connector via an interface cable.

60. An apparatus according to claim 55, wherein the driver stored in said second memory means comprises a program for controlling the external device connected by said IC and pseudo IC card connector.

61. An apparatus according to claim 55, wherein the driver is loaded in said second memory means when said apparatus is turned on.

62. An apparatus according to claim 55, wherein the device driver is loaded in said second memory means when the external apparatus is connected by said IC and pseudo IC card connector.

63. An apparatus according to claim 55, wherein said apparatus comprises a notebook personal computer.

64. An apparatus according to claim 55, wherein said apparatus comprises an electronic pocket book.

65. An apparatus according to claim 55, wherein said apparatus comprises an electronic camera.

66. An apparatus according to claim 55, wherein said apparatus comprises a facsimile apparatus.

67. An apparatus according to claim 55, wherein said connector has 68 signal pins.

68. An apparatus according to claim 55, further comprising a display for displaying a character.

69. An apparatus according to claim 55, further comprising a keyboard for inputting a character.

70. A pseudo IC card detachably connected to an information processing apparatus, said card comprising:

first memory means for storing data;

an external device controller controlling the input/output operation to/from an external device; and second memory means for storing a device driver for the device, which will be loaded into the information processing apparatus, the external device controller operating in response to signals generated in accordance with the loaded device driver.

71. A device according to claim 70, wherein said device comprises a random access memory card.

72. A device according to claim 70, wherein said device comprises a read only memory card.

73. A device according to claim 70, wherein said device comprises an input/output card for inputting or outputting information between the information processing apparatus and another information processing apparatus.

74. A device according to claim 70, wherein said device comprises another information processing apparatus which is connected to the information processing apparatus via an interface cable.

75. A device according to claim 70, wherein the device driver comprises a program for controlling said device and is executed in the information processing apparatus.

76. A device according to claim 70, wherein the device driver is loaded from said second memory means into the information processing apparatus when the apparatus is turned on.

77. A device according to claim 70, wherein the device driver is loaded from said second memory means into the information processing apparatus when said device is connected to the apparatus.

78. A pseudo IC card detachably connected to an information processing apparatus, said card comprising:

a data memory for storing data;

an external device controller controlling the input/output operation to/from an external device; and a program memory for storing a device driver for the device which will be loaded into the information processing apparatus, the external device controller operating in response to signals generated in accordance with the loaded device driver.

79. A device according to claim 78, wherein said device comprises a random access memory card.

80. A device according to claim 78, wherein said device comprises a read only memory card.

81. A device according to claim 78, wherein said device comprises an input/output card for inputting or outputting information between the information processing apparatus and another information processing apparatus.

82. A device according to claim 78, wherein said device comprises another information processing apparatus which is connected to the information processing apparatus via an interface cable.

83. A device according to claim 78, wherein the device driver comprises a program for controlling said device and is executed in the information processing apparatus.

84. A device according to claim 78, wherein the device driver is loaded from said second memory means into the information processing apparatus when the apparatus is turned on.

85. A device according to claim 78, wherein the device driver is loaded from said program memory means to the information processing apparatus when said device is connected to the apparatus.

86. An information processing method for performing high speed parallel data transmission with an external device through an IC and pseudo IC card carried out in an information processing apparatus comprising the IC and pseudo IC card connector, the pseudo IC card connecting to an external device, the pseudo IC card including an external device controller controlling the input/output operation to/from the external device, said method comprising the steps of:

determining whether an IC card or a pseudo IC card is attached to the IC and pseudo IC card connector by reading and discriminating directory management data stored in the card attached to the information processing apparatus through the IC and pseudo IC card connector, loading an IC card control driver into a second memory from a first memory, the IC card control driver being used if said determining step determines that an IC card is connected to the IC and pseudo IC card connector, loading a pseudo IC card control driver into the second memory from the first memory, the pseudo IC card control driver being used if said determining step determines that a pseudo IC card is connected to the IC and pseudo IC card connector, performing parallel data transmission between the information processing apparatus and the external device through the IC and pseudo IC card connector and the pseudo IC card when said determining step determines that a pseudo IC card is connected to the IC and pseudo IC card connector and the pseudo IC card control driver is loaded into the second memory, wherein the first memory is located in one of the information processing apparatus and the pseudo IC card.

87. A method according to claim 86, wherein the external device comprises a random access memory card.

88. A method according to claim 86, wherein the external device comprises a read only memory card.

89. A method according to claim 86, wherein the external device comprises an input/output card for inputting or outputting information between the information processing apparatus and another information processing apparatus.

90. A method according to claim 86, wherein the external device comprises another information processing apparatus which is connected by the IC and pseudo IC card connector via an interface cable.

91. A method according to claim 86, wherein said loading steps are performed in accordance with a program, wherein the program comprises an operating system.

92. A method according to claim 86, wherein the loaded driver comprises a program for controlling the external device connected by the IC and pseudo IC card connector.

93. A method according to claim 86, further comprising the step of operating the loaded driver to control the external device connected by the IC and pseudo IC card connector.

94. A method according to claim 86, further comprising the step of loading the driver when the apparatus is turned on.

95. A method according to claim 86, further comprising the step of loading the driver when the external device is connected by the IC and pseudo IC card connector.

96. A method according to claim 86, wherein the apparatus comprises a notebook personal computer.

97. A method according to claim 86, wherein the apparatus comprises an electronic pocket book.

98. A method according to claim 86, wherein the apparatus comprises an electronic camera.

99. A method according to claim 86, wherein the apparatus comprises a facsimile apparatus.

100. A method according to claim 86, wherein the IC and pseudo IC card connector has 68 signal pins.

101. A method according to claim 86, further comprising the step of displaying a character.

102. A method according to claim 86, further comprising the step of inputting a character.

103. An information processing method for performing high speed parallel data transmission with an external device through an IC and pseudo IC card carried out in an information processing apparatus having an IC and pseudo IC car connector, the pseudo IC card including an external device controller controlling the input/output operation to/from the external device, said method comprising the steps of:

determining whether an IC card or a pseudo IC card is attached to the IC and pseudo IC card connector by reading and discriminating directory management data stored in the card attached to the information processing apparatus through the IC and pseudo IC card connector, loading an IC card control driver into a second memory from a first memory, the IC card control driver being used if said determining step determines that an IC card is connected to the IC and pseudo IC card connector, loading a pseudo IC card control driver into the second memory from the first memory, the pseudo IC card control driver being used if said determining step determines that a pseudo IC card is connected to the IC and pseudo IC card connector, performing parallel data transmission between the information processing apparatus and the external device through the IC and pseudo IC card connector and the pseudo IC card when said determining step determines that a pseudo IC card is connected to the IC and pseudo IC card connector and the pseudo IC card control driver is loaded into the second memory, wherein the first memory is located in the pseudo IC card.

104. A method according to claim 103, wherein the external device comprises a random access memory card.

105. A method according to claim 103, wherein the external device comprises a read only memory card.

106. A method according to claim 103, wherein the external device comprises an input/output card for inputting or outputting information between the information processing apparatus and another information processing apparatus.

107. A method according to claim 103, wherein the external device comprises another information processing apparatus which is connected by the IC and pseudo IC card connector via an interface cable.

108. A method according to claim 103, wherein said loading steps load the driver in accordance with an operating system for loading the driver for the external device from the external device.

109. A method according to claim 103, wherein the loaded driver comprises a program for controlling the external device connected by the IC and pseudo IC card connector.

110. A method according to claim 103, further comprising the step of operating the loaded driver to control the external device connected by the IC and pseudo IC card connector.

111. A method according to claim 1, wherein said loading steps load the driver when the apparatus is turned on.

112. A method according to claim 103, wherein said loading steps load the driver when the external device is connected by the IC and pseudo IC card connector.

113. A method according to claim 103, wherein the apparatus comprises a notebook personal computer.

114. A method according to claim 103, wherein the apparatus comprises an electronic pocket book.

115. A method according to claim 103, wherein the apparatus comprises an electronic camera.

116. A method according to claim 103, wherein the apparatus comprises a facsimile apparatus.

117. A method according to claim 103, wherein the IC and pseudo IC card connector has 68 signal pins.

118. A method according to claim 103, further comprising the step of displaying a character.

119. A method according to claim 103, further comprising the step of inputting a character.

120. An information processing apparatus for performing high speed parallel data transmission with an external device through an IC and pseudo IC card comprising:

IC and pseudo IC card connecting means for connecting an IC card and a pseudo IC card to said apparatus, the pseudo IC card connecting to an external device, the pseudo IC card comprising an external device controller controlling the input/output operation to/from the external device;

means for determining whether an IC card or a pseudo IC card is attached to said IC and pseudo IC card connector by reading and discriminating directory management data stored in the card attached to said information processing apparatus through said IC and pseudo IC card connector, wherein said determining means loads an IC card control driver into a second memory from a first memory, the IC card control driver being used if said central processing unit determines that an IC card is connected to said IC and pseudo IC card connector, wherein said determining means loads a pseudo IC card control driver into the second memory from the first memory, said pseudo IC card control driver being used if said central processing unit determines that a pseudo IC card is connected to said IC and pseudo IC card connector, wherein said determining means performs parallel data transmission between said information processing apparatus and the external device through the IC and pseudo IC card connector and the pseudo IC card when said central processing unit determines that a pseudo IC card is connected to said IC and pseudo IC card connector and the pseudo IC card control driver is loaded into the second memory, wherein the first memory is located in one of said information processing apparatus and the pseudo IC card; and the second memory into which the IC card control driver and the pseudo IC card control driver are loaded.

121. An apparatus according to claim 120, wherein the external device comprises a random access memory card.

122. An apparatus according to claim 120, wherein the external device comprises a read only memory card.

123. An apparatus according to claim 120, wherein the external device comprises an input/output card for inputting or outputting information between said information processing apparatus and another information processing apparatus.

124. An apparatus according to claim 120, wherein the external device comprises another information processing apparatus which is connected by said IC and pseudo IC card connecting means via an interface cable.

125. An apparatus according to claim 120, wherein the driver stored in said second memory comprises a program for controlling the external device connected by said IC and pseudo IC card connecting means.

126. An apparatus according to claim 120, wherein the driver is loaded into said second memory when said apparatus is turned on.

127. An apparatus according to claim 120, wherein the driver is loaded into said second memory when the external apparatus is connected by said IC and pseudo IC card connecting means.

128. An apparatus according to claim 120, wherein said apparatus comprises a notebook personal computer.

129. An apparatus according to claim 120, wherein said apparatus comprises an electronic pocket book.

130. An apparatus according to claim 120, wherein said apparatus comprises an electronic camera.

131. An apparatus according to claim 120, wherein said apparatus comprises a facsimile apparatus.

132. An apparatus according to claim 120, wherein said IC and pseudo IC card connecting means has 68 signal pins.

133. An apparatus according to claim 120, further comprising display means for displaying a character.

134. An apparatus according to claim 120, further comprising input means for inputting a character.

135. A computer usable storage medium having computer readable program code means embodied therein for causing a computer of an information processing apparatus to perform high speed parallel data transmission with an external device through an IC and pseudo IC card and having an IC and pseudo IC card connector for connecting an IC card and a pseudo IC card to the apparatus, the pseudo IC card connecting to an external device the apparatus, the pseudo IC card including an external device controller controlling input/output operations to/from the external device, the computer readable program code means comprising:

first computer readable program code means for causing the computer to determine whether an IC card or a pseudo IC card is attached to the IC and pseudo IC card connector by reading and discriminating directory management data stored in the card attached to the information processing apparatus through the IC and pseudo IC card connector, second computer readable program code means for causing the computer to load an IC card control driver into a second memory from a first memory, the IC card control driver being used if said first computer readable program code means causes the computer to determine that an IC card is connected to the IC and pseudo IC card connector, third computer readable program code means for causing the computer to load a pseudo IC card control driver into the second memory from the first memory, the pseudo IC card control driver being used if said first computer readable program code means causes the computer to determine that a pseudo IC card is connected to the IC and pseudo IC card connector, fourth computer readable program code means for causing the computer to perform parallel data transmission between the information processing apparatus and the external device through the IC and pseudo IC card connector and the pseudo IC card when said first computer readable program code means causes the computer to determine that a pseudo IC card is connected to the IC and pseudo IC card connector and the pseudo IC card control driver is loaded into the second memory, wherein the first memory is located in one of said information processing apparatus and the pseudo IC card.

136. A medium according to claim 135, wherein the external device comprises a random access memory card.

137. A medium according to claim 135, wherein the external device comprises a read only memory card.

138. A medium according to claim 135, wherein the external device comprises an input/output card for inputting or outputting information between the information processing apparatus and another information processing apparatus.

139. A medium according to claim 135, wherein the external device comprises another information processing apparatus which is connected by the IC and pseudo IC card connector via an interface cable.

140. A medium according to claim 135, wherein said second and third computer readable program code means comprise an operating system.

141. A medium according to claim 135, wherein the loaded driver comprises a program for controlling the external device connected by the IC and pseudo IC card connector.

142. A medium according to claim 135, wherein said second and third computer readable program code means control the computer to operate the loaded driver to control the external device connected by the IC and pseudo IC card connector.

143. A medium according to claim 135, wherein said second and third computer readable program code means cause the computer to load a driver when the computer is turned on.

144. A medium according to claim 135, wherein said second and third computer readable program code means cause the computer to load a driver when the external device is connected by the IC and pseudo IC card connector.

145. A medium according to claim 135, wherein the apparatus comprises a notebook personal computer.

146. A medium according to claim 135, wherein the apparatus comprises an electronic pocket book.

147. A medium according to claim 135, wherein the apparatus comprises an electronic camera.

148. A storage medium according to claim 135, wherein the apparatus comprises a facsimile apparatus.

149. A medium according to claim 135, wherein the IC and pseudo IC card connector has 68 signal pins.

150. A medium according to claim 135, further comprising fifth computer readable program code means for causing the computer to display a character.

151. A medium according to claim 135, further comprising fifth computer readable program code means for causing the computer to input a character.

152. A computer usable medium having computer readable program code means embodied therein for causing a computer of an information processing apparatus to perform high speed parallel data transmission with an external device through an IC and Pseudo IC card and having an IC and pseudo IC card connector connecting an IC card and a pseudo IC card to the apparatus, the pseudo IC card connecting to an external device, the pseudo IC card including an external device controller controlling the input/output operation to/from the external device, the program performing the steps of:

first computer readable program code means for causing the computer to determine whether an IC card or a pseudo IC card is attached to the IC and pseudo IC card connector by reading and discriminating directory management data stored in the card attached to the information processing apparatus through the IC and pseudo IC card connector, second computer readable program code means for causing the computer to load an IC card control driver into a second memory from a first memory, the IC card control driver being used if said first computer readable program code means causes the computer to determine that an IC card is connected to the IC and pseudo IC card connector, third computer readable program code means for causing the computer to load a pseudo IC card control driver into the second memory from the first memory, the pseudo IC card control driver being used if said first computer readable program code means causes the computer to determine that a pseudo IC card is connected to the IC and pseudo IC card connector, fourth computer readable program code means for causing the computer to perform parallel data transmission between the information processing apparatus and the external device through the IC and pseudo IC card connector and the pseudo IC card when said first computer readable program code means causes the computer to determine that a pseudo IC card is connected to the IC and pseudo IC card connector and the pseudo IC card control driver is loaded into the second memory, wherein the first memory is located in the pseudo IC card.

153. A medium according to claim 152, wherein the external device comprises a random access memory card.

154. A medium according to claim 152, wherein the external device comprises a read only memory card.

155. A medium according to claim 152, wherein the external device comprises an input/output card for inputting or outputting information between the information processing apparatus and another information processing apparatus.

156. A medium according to claim 152, wherein the external device comprises another information processing apparatus which is connected by the IC and pseudo IC card connector via an interface cable.

157. A medium according to claim 152, wherein said second and third computer readable program code means cause the computer to load a driver in accordance with an operating system for loading the driver for the external device from the external device.

158. A medium according to claim 152, wherein said second and third computer readable program code means comprise a program for controlling the external device connected by the IC and pseudo IC card connector.

159. A medium according to claim 152, wherein said second and third computer readable program code means cause the computer to operate the loaded driver to control the external device connected by the IC and pseudo IC card connector.

160. A medium according to claim 152, wherein said second and third computer readable program code means cause the computer to load the driver when the computer is turned on.

161. A medium according to claim 152, wherein said second and third computer readable program code means cause the computer to load the driver when the external device is connected by the IC and pseudo IC card connector.

162. A medium according to claim 152, wherein the apparatus comprises a notebook personal computer.

163. A medium according to claim 152, wherein the apparatus comprises an electronic pocket book.

164. A medium according to claim 152, wherein the apparatus comprises an electronic camera.

165. A medium according to claim 152, wherein the apparatus comprises a facsimile apparatus.

166. A medium according to claim 152, wherein the IC and pseudo IC card connector has 68 signal pins.

167. A medium according to claim 152, further comprising fifth computer readable program code means for causing the computer to display a character.

168. A medium according to claim 152, further comprising fifth computer readable program code means for causing the computer to input a character.

169. An information processing apparatus for performing data transmission with an external apparatus, said information processing apparatus comprising:

connection means for connecting a first IC card and a second IC card to said information processing apparatus, the second IC card connecting to the external apparatus;

determination means for determining whether the first IC card or the second IC card is attached to said connection means by reading and discriminating data stored in the first or second IC card;

loading means for loading an IC card control driver from a first memory into a second memory if said determination means determines that the second IC card is attached to said connection means; and control means for performing data transmission between said information processing apparatus and the external apparatus through said connection means and the second IC card using the IC card control driver loaded by said loading means if said determination means determines that the second IC card is attached to said connection means.

170. An apparatus according to claim 169, wherein the IC card control driver comprises a program for controlling the second IC card.

171. An apparatus according to claim 169, wherein said control means controls data transmission with a memory provided in the first IC card if said determination means determines that the first IC card is attached to said connection means.

172. An apparatus according to claim 169, wherein the second IC card connects to the external apparatus via a cable.

173. An apparatus according to claim 169, herein said information processing apparatus is a notebook personal computer.

174. An apparatus according to claim 169, wherein said information processing apparatus is a portable data terminal.

175. An apparatus according to claim 169, wherein said information processing apparatus is an electronic camera.

176. An apparatus according to claim 169, wherein the first memory comprises a non-volatile memory.

177. An apparatus according to claim 169, wherein the second memory comprises a RAM.

178. An apparatus according to claim 169, wherein the external apparatus comprises a storage device.

179. An apparatus according to claim 169, wherein the external apparatus comprises a printer.

180. An apparatus according to claim 169, wherein the data stored in the first or second IC card indicates an IC card type.

181. An apparatus according to claim 169, herein the second IC card stores data which indicates the IC card control driver corresponding to the second IC card.

182. An apparatus according to claim 169, wherein the second IC card comprises an external apparatus controller for controlling data transmission with the external apparatus.

183. An information processing method for performing data transmission between an information processing apparatus and an external apparatus, said information processing method comprising the steps of:

connecting a first IC card and a second IC card to the information processing apparatus with connection means, the second IC card connecting to the external apparatus;

determining whether the first IC card or the second IC card is attached to the connection means by reading and discriminating data stored in the first or second IC card;

loading an IC card control driver from a first memory into a second memory of the information processing apparatus if said determining step determines that the second IC card is attached to the connection means; and performing data transmission between their formation processing apparatus and the external apparatus through the connection means and the second IC card using the IC card control driver loaded by said loading step if said determining step determines that the second IC card is attached to the connection means.

184. A method according to claim 183, wherein said loading step comprises the step of loading an IC card control driver comprising a program for controlling the second IC card.

185. A method according to claim 183, wherein said performing step controls data transmission with a memory provided in the first IC card if said determining step determines that the first IC card is attached to the connection means.

186. A method according to claim 183, further comprising the step of connecting the second IC card to the external apparatus via a cable.

187. A method according to claim 183, wherein the information processing apparatus is a notebook personal computer.

188. A method according to claim 183, wherein the information processing apparatus is a portable data terminal.

189. A method according to claim 183, wherein the information processing apparatus is an electronic camera.

190. A method according to claim 183, wherein the first memory comprises a non-volatile memory.

191. A method according to claim 183, wherein the second memory comprises a RAM.

192. A method according to claim 183, wherein the external apparatus comprises a storage device.

193. A method according to claim 183, wherein the external apparatus comprises a printer.

194. A method according to claim 183, wherein said determining step comprises the step of reading data stored in the first or second IC card indicating an IC card type.

195. A method according to claim 183, wherein the second IC card stores data which indicates the IC card control driver corresponding to the second IC card.

196. A method according to claim 183, wherein the second IC card comprises an external apparatus controller for controlling data transmission with the external apparatus.

197. A storage medium storing a program used in an information processing apparatus for performing data transmission with an external apparatus and for connecting a first IC card and a second IC card to the information processing apparatus with connection means, the second IC card connecting to the external apparatus, the pro gram instructing the information processing apparatus to perform the steps of:

determining whether the first IC card or the second IC card is attached to the connection means by reading and discriminating data stored in the first or second IC card;

loading an IC card control driver from a first memory into a second memory of the information processing apparatus if said determining step determines that the second IC card is attached to the connection means; and performing data transmission between the information processing apparatus and the external apparatus through the connection means an IC the second IC card using the IC card control driver loaded by said loading step if said determining step determines that the second IC card is attached to the connection means.

198. A medium according to claim 197, wherein said loading step comprises the step of loading an IC card control driver comprising a program for controlling the second IC card.

199. A medium according to claim 197, wherein said performing step controls data transmission with a memory provided in the first IC card if said determining step determines that the first IC card is attached to the connection mean.

200. A medium according to claim 197, wherein the second IC card is connected to the external apparatus via a cable.

201. A medium according to claim 197, wherein the information processing apparatus is a notebook personal computer.

202. A medium according to claim 197, wherein the information processing apparatus is a portable data terminal.

203. A medium according to claim 197, wherein the information processing apparatus is an electronic camera.

204. A medium according to claim 197, wherein the first memory comprises a non-volatile memory.

205. A medium according to claim 197, wherein the second memory comprises a RAM.

206. A medium according to claim 197, wherein the external apparatus comprises a storage device.

207. A medium according to claim 197, wherein the external apparatus comprises a printer.

208. A medium according to claim 197, wherein said determining step comprises the step of reading data stored in the first or second IC card indicating an IC card type.

209. A medium according to claim 197, wherein the second IC card stores data which indicates the IC card control driver corresponding to the second IC card.

210. A medium according to claim 197, wherein the second IC card comprises an external apparatus controller for controlling data transmission with the external apparatus.

211. A program used in an information processing apparatus for performing data transmission with an external apparatus and for connecting a first IC card and a second IC card to the information processing apparatus with connection means, the second IC card connecting to the external apparatus, the program instructing the information processing apparatus to perform the steps of:

determining whether the first IC card or the second IC card is attached to the connection means by reading and discriminating data stored in the first or second IC card;

loading an IC card control driver from a first memory into a second memory of the information processing apparatus if said determining step determines that the second IC card is attached to the connection means; and performing data transmission between the information processing apparatus and the external apparatus through the connection means and the second IC card using the IC card control driver loaded by said loading step if said determining step determines that the second IC card is attached to the connection means.

212. A program according to claim 211, wherein said loading step comprises the step of loading an IC card control driver comprising a program for controlling the second IC card.

213. A program according to claim 211, wherein said performing step controls data transmission with a memory provided in the first IC card if said determining step determines that the first IC card is attached to the connection means.

214. A program according to claim 211, wherein the second IC card is connected to the external apparatus via a cable.

215. A program according to claim 211, wherein the information processing apparatus is a notebook personal computer.

216. A program according to claim 211, wherein the information processing apparatus is a portable data terminal.

217. A program according to claim 211, wherein the information processing apparatus is an electronic camera.

218. A program according to claim 211, wherein the first memory comprises a non-volatile memory.

219. A program according to claim 211, wherein the second memory comprises a RAM.

220. A program according to claim 211, wherein the external apparatus comprises a storage device.

221. A program according to claim 211, wherein the external apparatus comprises a printer.

222. A program according to claim 211, wherein said determining step comprises the step of reading data stored in the first or second IC card indicating an IC card type.

223. A program according to claim 211, wherein the second IC card stores data which indicates the IC card control driver corresponding to the second IC card.

224. A program according to claim 211, wherein the second IC card comprises an external apparatus controller for controlling data transmission with the external apparatus.

* * * * *

UNITED STATES PATENT AND TRADEMARK OFFICE
CERTIFICATE OF CORRECTION

PATENT NO.     : 6,298,388 B1
DATED          : October 2, 2001
INVENTOR(S)    : Tomishige Taguchi It is certified that error appears in the above-identified patent and that said Letters Patent is hereby corrected as shown below:

Title page,
Item [56], FOREIGN PATENT DOCUMENTS, "0251477" should read -- 0 251 477 --; "0351961" should read -- 0 351 961 --; and "0426414" should read -- 0 426 414 --.

Column 2,
Line 1, "apace" should read -- space --.
Line 2, "of" should be deleted.
Line 16, "using" should be deleted.
Line 54, "IC/card;" should read -- IC card; --.

Column 3,
Line 51, "referred" should read -- referred to --.
Line 54, "a outside;" should read -- the outside --; and "the DMA" should read -- a DMA --.

Column 4,
Line 47, "distinguishment" should read -- distinction --.
Line 56, "access" should read -- gain access --.

Column 7,
Line 10, "Performs" should read -- performs --.

Column 10,
Line 61, "connector" should read -- connector, --.

Column 11,
Line 6, "Pseudo" should read -- pseudo --.

Column 14,
Line 1, "car" should read -- card --.
Line 51, "claim 1," should read -- claim 103, --.

Column 17,
Line 42, "Pseudo" should read -- pseudo --.

Column 19,
Lines 30 and 48, "herein" should read -- wherein --.

UNITED STATES PATENT AND TRADEMARK OFFICE
CERTIFICATE OF CORRECTION

PATENT NO. : 6,298,388 B1
DATED : October 2, 2001
INVENTOR(S) : Tomishige Taguchi It is certified that error appears in the above-identified patent and that said Letters Patent is hereby corrected as shown below:

Column 20,
Line 3, "their formation" should read -- the information --.
Line 48, "pro gram" should read -- program --.
Line 60, "an IC" should read -- and --.

Signed and Sealed this

Third Day of September, 2002

Attest:

Attesting Officer

JAMES E. ROGAN
Director of the United States Patent and Trademark Office